United States Patent
Robinson

(10) Patent No.: US 8,780,929 B2
(45) Date of Patent: *Jul. 15, 2014

(54) METHOD OF AND APPARATUS FOR ADAPTIVE CONTROL OF DATA BUFFERING IN A DATA TRANSMITTER

(75) Inventor: Nigel Philip Robinson, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 12/948,267

(22) Filed: Nov. 17, 2010

(65) Prior Publication Data

US 2011/0080874 A1 Apr. 7, 2011

Related U.S. Application Data

(63) Continuation of application No. 10/537,837, filed as application No. PCT/GB03/05205 on Nov. 27, 2003, now Pat. No. 7,860,992.

(30) Foreign Application Priority Data

Dec. 6, 2002 (GB) .................................. 0228520.3

(51) Int. Cl.
*H04L 12/28* (2006.01)
*H04L 12/56* (2006.01)
*H04L 1/12* (2006.01)

(52) U.S. Cl.
CPC .......... *H04L 47/127* (2013.01); *H04L 2001/125* (2013.01)
USPC .......................................... 370/412; 709/231

(58) Field of Classification Search
USPC .......................................... 370/412; 709/231
See application file for complete search history.

(56) References Cited

U.S. PATENT DOCUMENTS

| 5,802,310 | A  | * | 9/1998  | Rajaraman ..................... 709/234 |
| 6,697,604 | B1 | * | 2/2004  | Rimpela et al. ............. 455/67.14 |
| 7,181,223 | B1 | * | 2/2007  | Pecen et al. ................. 455/452.1 |
| 7,860,992 | B2 |   | 12/2010 | Robinson |
| 2010/0074181 | A1 | * | 3/2010 | Markovic et al. ............. 370/328 |

FOREIGN PATENT DOCUMENTS

| EP | 1 133 201    | * | 9/2001 |
| EP | 1133201 A1   |   | 9/2001 |
| WO | WO0042792    |   | 7/2000 |
| WO | WO02052800 A1|   | 7/2002 |

OTHER PUBLICATIONS

International Search Report & Written Opinion—PCT/GB2003/005205—International Search Authority, European Patent Office, Feb. 4, 2004.

* cited by examiner

*Primary Examiner* — Wanda Z Russell
(74) *Attorney, Agent, or Firm* — Abdollah Katbab

(57) ABSTRACT

A data transmitter divides incoming data for transmission into data blocks and passes them in frame transmission order to a radio link stage via a serial frame buffer. The buffer holds the data frames until the radio link stage is able to transmit them. The incoming data has associated with it various parameters. The radio link stage has allocated to it radio link resources. The parameters and resources, which change independently of each other from time to time, are supplied to a controller which calculates high and low buffer levels therefrom. The controller controls the passing of the data frames through the frame buffer to maintain the number of frames in the buffer at any instant of time at a level between the calculated high and low levels.

77 Claims, 1 Drawing Sheet

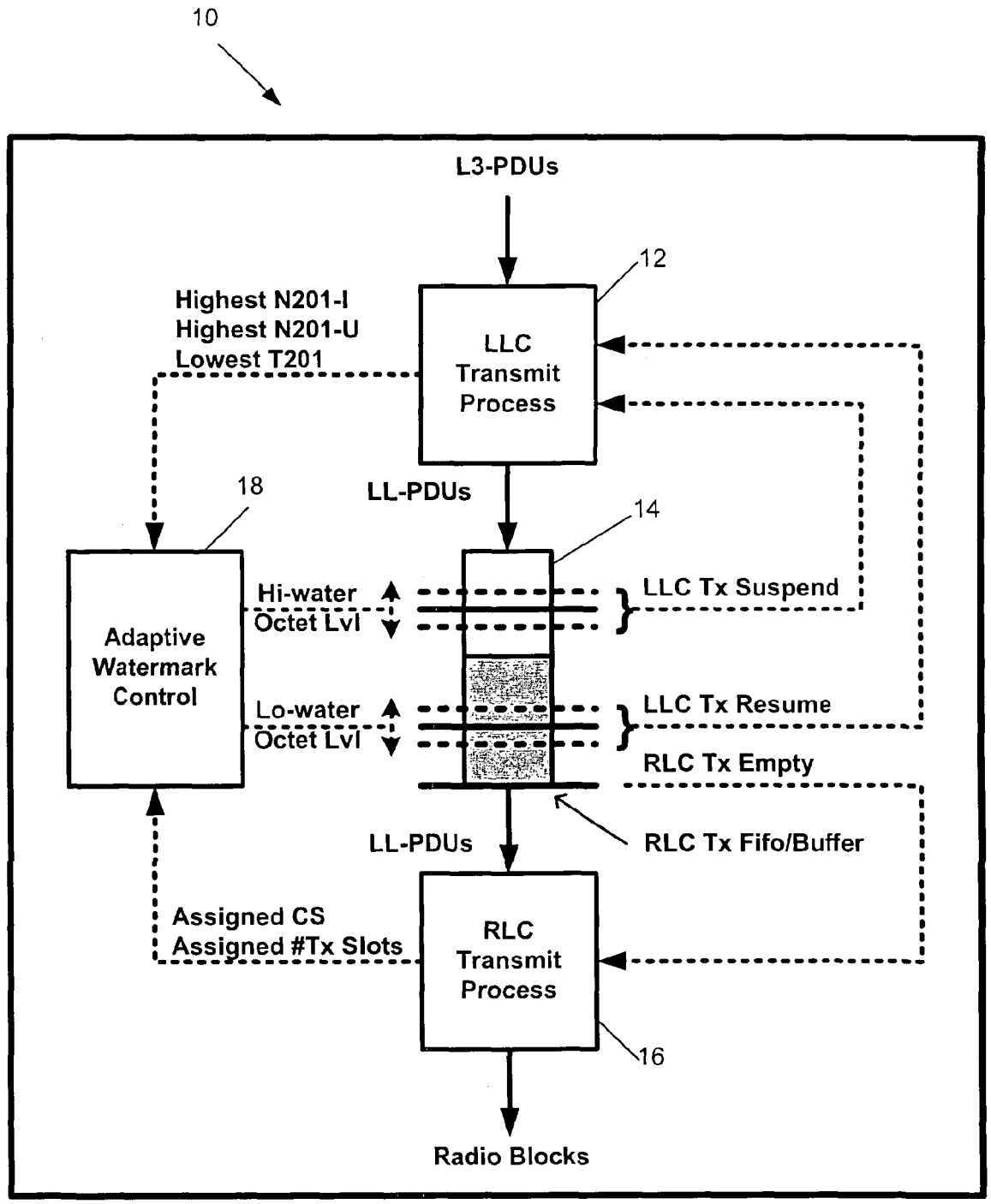

METHOD OF AND APPARATUS FOR ADAPTIVE CONTROL OF DATA BUFFERING IN A DATA TRANSMITTER

CLAIM OF PRIORITY UNDER 35 U.S.C. §120

The present application for patent is a continuation of patent application Ser. No. 10/537,837 entitled "METHOD OF AND APPARATUS FOR ADAPTIVE CONTROL OF DATA BUFFERING IN A DATA TRANSMITTER" filed Dec. 14, 2005, which claims priority from National Stage Entry of PCT Application Serial No. PCT/GB2003/005205 entitled "A METHOD OF AND APPARATUS FOR ADAPTIVE CONTROL OF DATA BUFFERING IN A DATA TRANSMITTER" filed Nov. 27, 2003, which claims priority from Great Britain Application No. 0228520.3 entitled "A METHOD OF AND APPARATUS FOR ADAPTIVE CONTROL OF DATA BUFFERING IN A DATA TRANSMITTER" filed Dec. 6, 2002, and assigned to the assignee hereof and hereby expressly incorporated by reference herein.

BACKGROUND

1. Field

The present invention relates generally to a method of and apparatus for transmitting data. The invention also relates to a method of and apparatus for adaptive control of data buffering in a transmitter. The method and apparatus are well suited for use in the GPRS standard but are not limited to such an application.

2. Background

The general packet radio system (GPRS) is a packet data based communication system that has been developed for GSM networks with the aim of providing networks built to this standard with a way to handle higher data speeds and packet switched connections. GPRS can also be used in time division multiple access (TDMA) networks (IS-136). It is intended to provide a transitional path to third generation (3G) wireless data services It enables the introduction of packet switching and Internet Protocol (IP). The GPRS standard is now well defined and is currently being deployed in existing GSM-based mobile networks, in order to provide a way for GSM operators to meet the growing demand for wireless packet data services.

The GPRS standard defines a logical link control (LLC) layer which provides a logical link between a mobile station (MS) and a serving GPRS support node (SGSN). The logical link control (LLC) provides services necessary to maintain a ciphered data link between the MS and the SGSN. The logical link is maintained as the MS moves between cells serviced by the same SGSN. When the MS moves to a cell being serviced by a different SGSN the existing connection is released and a new logical link connection is established.

The logical link control (LLC) provides for acknowledged and unacknowledged point-to-point-delivery of LLC protocol data units (PDUs) between the mobile station (MS) and the serving GPRS support node (SGSN) and point to multipoint delivery of packets from the SGSN to the MS. The LLC layer also provides for detecting errors from corrupted PDUs by checking a frame check sequence (FCS) in the LLC frame format. The FCS contains the value of a cyclic redundancy check (CRC) calculation performed over a header and information fields in a frame. For the acknowledged mode of transfer, the LLC may request retransmission of the frames of data for which an acknowledgement has not been received.

Network layer protocols are intended to operate over services derived from a wide variety of sub-networks and data links. GPRS supports several network layer protocols providing protocol transparency for of the service. All functions relating to the transfer of protocol data units (PDUs) are carried out transparently by GPRS network entities. A layer known as the Sub-Network Dependant Convergence Protocol (SNDCP) provides this protocol transparency and support for a variety of network layer protocols. The SNDCP is logically situated below the network layer and above the LLC layer. It performs multiplexing of data coming from different sources before the data is sent via the logical link control (LLC) layer.

Data to be transmitted is first multiplexed by the SNDCP. The data is then segmented by the LLC layer to maximum length LLC frames. These LLC frames are segmented into radio link control (RLC) data blocks or radio link control/ medium access control (RLC/MAC) control blocks, which are formatted into blocks of four successive time slots on the same physical channel.

The medium access control (MAC) layer provides capability for multiple mobile stations to share a common transmission medium. It interfaces directly with the physical layer. For the uplink (e.g. mobile station MS to a serving GPRS support node SGSN), the MAC layer plays the role of arbitrator, managing the limited physical resources among competing requestors. For the downlink, the MAC layer aids in the queuing and scheduling of access attempts and prioritizes data to be sent. Signaling data is given higher priority user data, but both are multiplexed onto the transmission medium by the MAC layer.

One problem with data transfer is that it can arrive in bursts depending on the source and/or medium from which it arrives. In one interval of time, several blocks of data may arrive in quick succession, whereas in the next interval of time only one block, or even no blocks, may arrive. Plainly, such "bursty" delivery of data is undesirable because it places overheads in terms of data management on the receiving entity. Ideally, the data should arrive at a constant rate that is as high as the receiving entity can competently handle.

One way in which "bursty" data could be handled would be to determine empirically the way in which the bursts of data generally arrive and to use a buffer large enough to maintain an essentially continuous flow of data from the source to the destination. While this approach will undoubtedly work, it is less than satisfactory because the buffer will have to be sufficiently large to hold data in the situation where a large burst of data arrives followed by a period of time when no data arrives. Most of the time a buffer of that size will be less than full and will therefore be underutilized. This is, of course, a waste of resources and is therefore undesirable.

SUMMARY

The invention aims to address the above-discussed and related problems.

According to one aspect of the invention there is provided an apparatus for transmitting data, the apparatus comprising: segmenting means for segmenting data into data frames; buffering means for buffering the data frames from the segmenting means; transmitting means, connected to the buffering means to receive data frames therefrom, for transmitting the data frames; and controlling means for controlling the segmenting means, the controlling means being arranged to receive parameter data from the segmenting means and the transmitting means pertaining to the data and to the transmission of data frames, to calculate a high watermark value and a low watermark value corresponding to maximal and minimal numbers of data frames to be buffered in the buffering means, and to control the segmenting means to maintain the number of data frames in the store between the high and low watermark values.

According to another aspect of the invention there is provided a method of transmitting data, the method comprising: segmenting data into data frames; buffering the data frames; receiving buffered data frames; transmitting the data frames; receiving parameter data pertaining to the data and to the transmission of data frames; calculating a high watermark value and a low watermark value corresponding to maximal and minimal numbers of data frames to be buffered; and maintaining the number of buffered data frames between the high and low watermark values.

According to a further aspect of the invention there is provided a data transmitter in which incoming data for transmission is divided into data blocks and passed in frame transmission order to a radio link stage via a serial frame buffer which holds the data until the radio link is able to transmit it, the incoming data having associated with it various parameters and the radio link stage having allocated to it radio link resources which parameters and resources change independently of each other from time to time and are supplied to a controller which calculates high and low buffer levels therefrom and controls the passing of the data frames through the frame buffer to maintain the number of frames in the buffer at any instant of time at a level between the calculated high and low levels.

In the practice of the invention, flow control thresholds are applied to the transmit buffering levels of the RLC layer in a GPRS entity. The flow control thresholds are set as a function of both relevant internal LLC operating parameters that influence transmit delay susceptibility, and an estimate of the throughput of the radio link. The estimate depends on the assigned coding scheme and multi-slot characteristics. By altering the flow control thresholds adaptively, the flow control mechanism permits optimal levels of RLC transmit buffering over the majority of conditions.

The above and further features of the invention are set forth with particularity in the appended claims and together with advantages thereof will become clearer from consideration of the following detailed description of an embodiment of the invention given by way of example with reference to the accompanying drawings.

BRIEF DESCRIPTION OF THE DRAWINGS

FIG. 1 shows a transmitter for transmitting data over a radio link.

DETAILED DESCRIPTION

Turning now to FIG. 1 of the accompanying drawings, there is shown a general packet radio system (GPRS) transmit entity 10 (e.g. a mobile station MS) in which protocol data units (PDUs) are delivered from a source (not shown) to a logical link control (LLC) layer 12 to be prepared for transmission. The SNDCP is logically situated below the network layer and above the LLC layer. Typically the data will be delivered to the LLC layer 12 from a layer known as the Sub-Network Dependant Convergence Protocol (SNDCP) which provides support for a variety of network layer protocols and performs multiplexing of data coming from different sources before the data is sent to the logical link control (LLC) layer 12.

The data from the SNDCP layer (not shown) is segmented by the LLC layer 12 into maximum length LLC frames, known as logical link protocol data units (LL PDUs). The LL-PDUs are then input to a radio link control (RLC) FIFO buffer 14 where they are held until required by an RLC transmit process 16. Once the LL-PDUs have been supplied from the FIFO buffer 14, they are formatted into radio blocks which are output for transmission in time slots in a physical channel.

In order to adapt the typically high data rate of a data souring application to a typically lower data rate of a communication channel, it is desirable to propagate flow control orders back up the data protocol layers towards the data source. Flow control thresholds or "watermarks" are typically applied against a protocol layer's buffer level. The action of crossing these watermarks is to suspend or resume the processing activities of the preceding layer in the data path. While the setting of watermarks may seem to be a simple matter, the reality is that there are a number of potentially conflicting considerations that need to be taken into account.

It is desirable for the RLC transmit process 16 to be able to "see" at least two LL-PDUs for transmission at any given time. This permits the process of radio resource allocation via the media access control (MAC) protocol (not shown), to be re-negotiated for the forthcoming LL-PDU, whilst transmission of the current LL-PDU takes place. This requirement can be met by increasing the size of the FIFO buffer 14.

The LLC protocol often 'piggybacks' receive-acknowledgement signaling information on the back of data-bearing frames, together with acknowledgement request signaling. The transmit delay associated with the conveyance of a frame's potentially large data payload serves to delay the efficient operation of the protocol. This delay will be made worse by excess buffering in the path, so the need here is to reduce the size of the FIFO buffer 14.

The LLC protocol embodies a number of logical channels, each managed by its own logical link entity (LLE) (not shown). Each LLE operates to a set of internal parameters which are required to assume initial default values, but which may subsequently be re-negotiated at any time, to different values through exchange of Identity (XID) signaling transactions. One of these parameters is defined by a system timer-known as "T201" (not shown) which defines how long the associated LLE shall wait for a reply following the transmission of an acknowledgement request before considering retransmission. Excessive delay in the FIFO buffer 14 could cause premature expiry and retransmission that would otherwise have been unnecessary. This will reduce the throughput of data, which is, of course, undesirable.

It will therefore be appreciated that the allocation of radio resources for a given data transfer and the effective data rate achievable in that transfer are both dynamically changing factors. Simp ! y selecting watermarks in advance is unlikely to be acceptable because of these changing requirements.

The transmit entity 10 therefore comprises an adaptive watermark controller 18. The controller 18 is arranged to chose watermark values that provide sufficient data to satisfy the needs of the protocol layer taking receipt, i.e. the RLC layer 16 in this example, and at the same time to minimize the buffer's contribution to transmit delay as presented to the preceding protocol layers, i.e. the LLC layer 12. The controller 18 receives parameter data from the LLC layer 12 and the RLC transmit process 16 and, based on that data, determines high and low watermarks for the FIFO buffer 14.

One of the parameters of the LLC layer 12 considered to be relevant is the retransmission timer that is most susceptible to transmit delay. In the GPRS standard this is the lowest T201 retransmission time-out value from a set of LLEs that serve LLC Service Access Point Identifiers (SAPI) 3, 5, 9 and 11 and which are currently operating in the Asynchronous Balanced Mode (ABM). This is represented by the legend "LLC Lowest T201" in FIG. 1. This parameter allows a "transmit delay time" (in seconds) to be determined. This is the time required to permit a maximal length LL-PDU to convey an LLC acknowledgement request to a peer protocol entity, and for the peer protocol entity to reply with an acknowledgement, again conveyed by a maximal length LL-PDU, without premature T201 retransmission time-out.

The transmit delay time is calculated from the equation:

transmit delay time=lowest $T201*k$ where k is a constant and 0<k<0.5.

Another of the parameters of the LLC layer 12 considered to be relevant is the largest protocol data unit (PDU) size that may be transmitted. In the GPRS standard this is the highest N201-I maximal length acknowledged mode Layer 3 Protocol Data Unit (L3-PDU) size, from the set of LLEs which serve LLC SAPIs 3, 5, 9 and 11, and which are currently operating in the Asynchronous Balanced Mode (ABM). This parameter determines the size of the largest acknowledged mode LL-PDU which may be passed to the RLC layer for transmission and is represented by the legend "LLC HighestN201-I" in FIG. 1. Also of interest from the LLC layer 12 is the size of the largest unacknowledged mode LL-PDU which may be passed to the RLC layer for transmission. In the GPRS standard this is the highest N201-U maximal length unacknowledged mode L3-PDU size of all LLEs. It is represented by the legend "LLC Highest N201-U" in FIG. 1.

These parameters enable the size (in octets) of the largest LL-PDU to be determined as being the greater of either: LLC highest N201-1+LLC maximal IS frame header size+FCS size, or LLC highestN201-U+LLC UI frame header size+ FCS size. where: the LLC maximal IS frame header size is the maximal size of an LLC information service frame, the LLC UI frame header size is the size of an unnumbered LLC information frame, and the FCS size is the size of the frame check sequence.

Two parameters from the RLC layer 16 are also used. The first is the coding scheme (CS) designation for the current radio resource allocation, as assigned by the MAC protocol (not shown). This parameter is used to determine the size of an RLC radio block payload and is represented by the legend "Assigned CS" in FIG. 1. Typical values for the assigned CSdesignations CS1 to CS4 are as follows:

Coding Scheme 1, RLC radio block payload=20 octet payload;

Coding Scheme 2, RLC radio block payload=30 octet payload;

Coding Scheme 3, RLC radio block payload=36 octet payload; and

Coding Scheme 4, RLC radio block payload=50 octet payload.

The second parameter of interest from the RLC layer 16 is the number of assigned transmission slots within each eight-slot GSM frame for the current radio resource allocation, as assigned by the MAC protocol (not shown). This parameter is used to estimate the rate at which RLC radio blocks will be transmitted over the radio link and is represented by the legend "Assigned# Tx Slots" in FIG. 1.

This parameter allows the 'RLC Transmit Rate' (octets per second) to be estimated from the equation:

$$RLC \text{ transmit rate} = \frac{\text{radio } blockpayload * \text{assigned number of transmit slots}}{GSM \text{ Frame Interval} * 4}$$

Once these values have been calculated, the number of octets for the high watermark is determined as being the lesser of either:

(RLC Transmit Rate*TransmitDelay)−Largest LL-PDU(1 if result<0)

or (2*LargestLL-PDU)−1

The number of octets for the low watermark is then determined from the equation: low watermark=high watermark*h where h is a constant and 0<h<1.

The watermark threshold values thus determined achieve a compromise between the desire for RLC to retain visibility of at least two LL-PDUs for efficient radio resource reallocation purposes, and the need to constrain this where LLC transmit delay restrictions exist. The foregoing calculations satisfy these requirements under the majority of applicable conditions.

Consider, for example, the following parameter values:

| | |
|---|---|
| Highest N201-I: | 1503 octets |
| Highest N201-U | 500 octets |
| Lowest T201: | 5 seconds |
| Number of Transmit Slots: | 1 |
| Coding Scheme: | 1 |
| k: | 0.4 |
| h: | 0.5 |

These parameters will give the following results:

| | |
|---|---|
| RLC radio block payload = | 20 octets (because coding scheme 1 is used) |
| RLC data transmit rate = | (20* 1)/(4*0.0046) |
| = | 1086 octets/second |
| transmit delay = | 5 * 0.4 |
| = | 2 seconds |
| largest LL-PDU = | greater of 1543 or 506 |
| = | 1543 octets |
| high watermark = | lesser of 629 or 3085 |
| = | 629 octets |
| low watermark = | 629 * 0.5 |
| = | 314 octets |

In contrast, the following parameters:

| | |
|---|---|
| Highest N201-I: | 1503 octets |
| Highest N201-U | 500 octets |
| Lowest T201: | 5 seconds |
| Number of Transmit Slots: | 4 |
| Coding Scheme: | 1 |
| k: | 0.4 |
| h: | 0.5 | will give the following results:

| | |
|---|---|
| RLC radio block payload = | 20 octets (because coding scheme 1 is used) |
| RLC data transmit rate = | (20* 4)/(4 ! 0.0046) |
| = | 4347 octets/second |
| transmit delay = | 5 * 0.4 |
| = | 2 seconds |
| largest LL-PDU = | greater of 1543 or 506 |
| = | 1543 octets |
| high watermark = | lesser of 7151 or 3085 |
| = | 3085 octets |
| low watermark = | 3085 * 0.5 |
| = | 1542 octets. |

The above two example illustrate how the watermarks will change as the parameters of interest change over time. The watermark controller 18 (see FIG. 1) is arranged to calculate the watermark values and to send control signals to the LLC layer 12 and the RLC layer 16. The calculated watermark values are used to define respective value bands 21 and 22. Bands are used to reduce the frequency at which operating conditions change.

When the amount of data in the FIFO buffer 16 is within the band 21 corresponding to the high watermark, a signal represented by the legend "LLC Tx Suspend" in FIG. 1 is generated and sent to the LLC layer 12. The LLC Tx Suspend signal causes the LC layer to suspend delivery of LL-PDUs to the buffer 14. When the amount of data in the FIFO buffer 16 is within the band 22 corresponding to the low watermark, a signal represented by the legend "LLC Tx Resume" in FIG. 1 is generated and sent to the LLC layer 12. The LLC Tx Resume signal causes the LC layer to restart delivery of LL-PDUs to the buffer 14. If the buffer 14 empties, a signal represented by the legend "RLC Tx Empty" is sent to the RLC layer 16. The RLC layer is then able to reallocate resources until more data is available in the buffer 14 for transmission Flow control thresholds are applied to the transmit buffering levels of the RLC layer in a GPRS entity. The flow control thresholds are set as a function of both relevant internal LLC operating parameters that influence transmit delay susceptibility, and an estimate of the throughput of the radio link. The estimate depends on the assigned coding scheme and multi-slot characteristics. By altering the flow control thresholds adaptively, the flow control mechanism permits optimal levels of RLC transmit buffering over the majority of conditions.

This foregoing method is primarily applicable to GPRS mobile stations, where the close physical proximity of the LLC, RLC and MAC protocol layers make the practical realization easier, but it is also applicable to other GPRS entities, and indeed, to other packet data based communication systems.

Having thus described the invention by reference to the embodiment shown in the drawing it is to be well understood that the embodiment in question is by way of example only and that modifications and variations such as will occur to those possessed of appropriate knowledge and skills may be made without departure from the spirit and scope of the invention as set forth in the appended claims and equivalents thereof.

What is claimed is:

1. An apparatus within a mobile station (MS) for transmitting data, the apparatus comprising:
    receiving means for receiving, internally within the MS, data from an application within the MS;
    segmenting means for segmenting the data received from the application into data frames;
    buffering means for buffering the data frames from the segmenting means;
    transmitting means, connected to the buffering means to receive data frames therefrom, for transmitting the data frames; and
    controlling means for controlling the segmenting means, the controlling means being arranged to receive parameter data from the segmenting means pertaining to the segmented data frames and radio link resources data from the transmitting means pertaining to the transmission of data frames, to calculate a high watermark value and a low watermark value in response to the received parameter data and radio link resources data corresponding to maximal and minimal numbers of data frames to be buffered in the buffering means, and to control the segmenting means to maintain the number of data frames in the buffering means between the and low watermark values,
    wherein the controlling means is further arranged to calculate a size of a largest frame from the largest data frame that may be passed to the transmitting means for transmission, wherein the high watermark value is calculated from the calculated size of the largest frame.

2. The apparatus as claimed in claim 1, wherein the controlling means is arranged to define a high band of values including the high watermark value and a low band of values including the low watermark values.

3. The apparatus as claimed in claim 2, wherein the controlling means is arranged to generate a suspend signal for the segmenting means when the number of data frames in the buffering means is in the high band.

4. The apparatus as claimed in claim 2, wherein the controlling means is arranged to generate a resume signal for the segmenting means when the number of data frames in the buffering means is in the low band.

5. The apparatus as claimed in claim 1, wherein the controlling means is operable to control the transmitting means, the controlling means being arranged to generate a buffer empty signal for the transmitting means when the buffering means contains no data.

6. The apparatus as claimed in claim 1, wherein the segmenting means is arranged to transfer to the controlling means parameter data pertaining to time-out value of a retransmission timer susceptible to delay.

7. The apparatus as claimed in claim 6, wherein the controlling means is arranged to calculate a transmit delay time by multiplying the time-out value by a constant, wherein the constant has a value greater than zero and less than or equal to 0.5.

8. The apparatus as claimed in claim 1, wherein the segmenting means is arranged to transfer to the controlling means parameter data pertaining to the size of the largest data frame that may be transmitted by the transmitter.

9. The apparatus as claimed in claim 1, wherein data frames may be transmitted in acknowledged and unacknowledged modes, and the controlling means is arranged to calculate the size of the largest frame as the greater of the largest data frame that may be passed to the transmitting means for transmission in the acknowledged mode and the largest data frame that may be passed to the transmitting means for transmission in the unacknowledged mode.

10. The apparatus as claimed in claim 1, wherein the radio link resources data from the transmitting means includes an allocated coding scheme and a number of allocated transmission slots for the data frames to be transmitted, and the controlling means is arranged to calculate a transmit rate from the allocated coding scheme and the number of allocated transmission slots.

11. The apparatus as claimed in claim 1,
    wherein the radio link resources data from the transmitting means includes an allocated coding scheme and a number of allocated transmission slots for the data frames to be transmitted, and the controlling means is arranged to calculate a transmit rate from the allocated coding scheme and the number of allocated transmission slots; and
    wherein the controlling means is arranged to calculate the high watermark value from the calculated size of the largest frame and the calculated transmit rate.

12. The apparatus as claimed in claim 1, wherein the controlling means is arranged to calculate the low watermark value as a fraction of the high watermark value.

13. A method within a mobile station (MS) of transmitting data, the method comprising:
- receiving, internally within the MS, data from an application within the MS;
- segmenting the data received from the application into data frames;
- buffering the data frames;
- receiving buffered data frames;
- transmitting the data frames;
- receiving parameter data pertaining to the segmented data frames and radio link resources data pertaining to the transmission of data frames;
- calculating a high watermark value and a low watermark value in response to the received parameter data and radio link resources data corresponding to maximal and minimal numbers of data frames to be buffered; and
- maintaining the number of buffered data frames between the high and low watermark values by controlling the segmenting data into data frames by monitoring the calculated high watermark value and the calculated low watermark value,
  - wherein the calculating further comprises calculating a size of a largest frame from the largest data frame that may be passed for transmission, wherein the high watermark value is calculated from the calculated size of the largest frame.

14. The method as claimed in claim 13, further comprising defining a high band of values including the high watermark value and a low band of values including the low watermark values.

15. The method as claimed in claim 14, further comprising generating a suspend signal for the segmenting when the number of buffered data frames is in the high band.

16. The method as claimed in claim 15, further comprising generating a resume signal for the segmenting when the number of buffered data frames is in the low band.

17. The method as claimed in claim 13, further comprising generating a buffer empty signal for the transmitting when there are no buffered data frames.

18. The method as claimed in claim 13, further comprising calculating a transmit delay time by multiplying a time-out value of a retransmission timer susceptible to delay by a constant, wherein the constant has a value greater than zero and less than or equal to 0.5.

19. The method as claimed in claim 13, wherein data frames may be transmitted in acknowledged and unacknowledged modes, the method further comprising calculating the size of the largest frame that may be transmitted as the greater of the largest data frame that may be transmitted in the acknowledged mode and the largest data frame that may be transmitted in the unacknowledged mode.

20. The method as claimed in claim 13, wherein data is transmitted according to an allocated coding scheme and a number of allocated transmission slots, the method further comprising calculating a transmit rate from the allocated coding scheme and the number of allocated transmission slots.

21. The method as claimed in claim 19,
- wherein data is transmitted according to an allocated coding scheme and a number of allocated transmission slots, the method further comprising calculating a transmit rate from the allocated coding scheme and the number of allocated transmission slots; and
- wherein the high watermark value is calculated from the calculated size of the largest frame and the calculated transmit rate.

22. The method as claimed in claim 13, wherein low watermark value is calculated as a fraction of the high watermark value.

23. A data transmitter within a mobile station (MS) in which incoming data for transmission is received internally from an application within the MS and divided into data blocks and passed in frame transmission order to a radio link stage via a serial frame buffer which holds the data until the radio link is able to transmit it, the incoming data having associated with it various parameters and the radio link stage having allocated to it radio link resources which parameters and resources change independently of each other from time to time and are supplied to a controller which calculates high and low buffer levels therefrom and controls the passing of the data frames through the frame buffer to maintain the number of frames in the buffer at any instant of time at a level between the calculated high and low levels,
- wherein the controller is further arranged to calculate a size of a largest frame from the largest data frame that may be passed to the transmitter for transmission, wherein the high watermark value is calculated from the calculated size of the largest frame.

24. An apparatus within a mobile station (MS) for transmitting data, comprising:
- a receiver for receiving, internally within the MS, data from an application within the MS;
- a first transmit processor operable to segment the data received from the application into data frames;
- a buffer operable to buffer the data frames from the first transmit processor;
- a second transmit processor, connected to the buffer and operable to receive data frames therefrom, and further operable to transmit the data frames; and
- a controller operable to control the first transmit processor, the controller being arranged to receive parameter data from the first transmit processor pertaining to the segmented data frames and radio link resources data from the second transmit processor pertaining to the transmission of data frames, to calculate a high watermark value and a low watermark value in response to the received parameter data and radio link resources data corresponding to maximal and minimal numbers of data frames to be buffered in the buffer, and to control the first transmit processor to maintain the number of data frames in the buffer between the high and low watermark values,
  - wherein the controller is further arranged to calculate a size of a largest frame from the largest data frame that may be passed for transmission, wherein the high watermark value is calculated from the calculated size of the largest frame.

25. The apparatus as claimed in claim 24, wherein the controller is arranged to define a high band of values including the high watermark value and a low band of values including the low watermark values.

26. The apparatus as claimed in claim 25, wherein the controller is arranged to generate a suspend signal for the first transmit processor when the number of data frames in the buffer is in the high band.

27. The apparatus as claimed in claim 25, wherein the controller is arranged to generate a resume signal for the first transmit processor when the number of data frames in the buffer is in the low band.

28. The apparatus as claimed in claim 24, wherein the controller is operable to control the second transmit processor, the controller being arranged to generate a buffer empty signal for the second transmit processor when the buffer contains no data.

29. The apparatus as claimed in claim 24, wherein the first transmit processor is arranged to transfer to the controller parameter data pertaining to time-out value of a retransmission timer susceptible to delay.

30. The apparatus as claimed in claim 29, wherein the controller is arranged to calculate a transmit delay time by multiplying the time-out value by a constant, wherein the constant has a value greater than zero and less than or equal to 0.5.

31. The apparatus as claimed in claim 24, wherein the first transmit processor is arranged to transfer to the controller parameter data pertaining to the size of the largest data frame that may be transmitted by the transmitter.

32. The apparatus as claimed in claim 31, wherein the controller is arranged to calculate the size of the largest frame from the largest data frame that may be passed to the second transmit processor for transmission.

33. The apparatus as claimed in claim 32, wherein data frames may be transmitted in acknowledged and unacknowledged modes, and the controller is arranged to calculate the size of the largest frame as the greater of the largest data frame that may be passed to the second transmit processor for transmission in the acknowledged mode and the largest data frame that may be passed to the second transmit processor for transmission in the unacknowledged mode.

34. The apparatus as claimed in claim 24, wherein the radio link resources data from the second transmit processor includes an allocated coding scheme and a number of allocated transmission slots for the data frames to be transmitted, and the controller is arranged to calculate a transmit rate from the allocated coding scheme and the number of allocated transmission slots.

35. The apparatus as claimed in claim 32, wherein the radio link resources data from the second transmit processor includes an allocated coding scheme and a number of allocated transmission slots for the data frames to be transmitted, and the controller is arranged to calculate a transmit rate from the allocated coding scheme and the number of allocated transmission slots; and
wherein the controller is arranged to calculate the high watermark value from the calculated size of the largest frame and the calculated transmit rate.

36. The apparatus as claimed in claim 24, wherein the controller is arranged to calculate the low watermark value as a fraction of the high watermark value.

37. The apparatus of claim 1, wherein the segmenting means segments the data into various length data frames in response to controls from the controlling means.

38. The apparatus of claim 1, wherein the segmenting means segments the data into a maximum length data frames allowed in response to controls from the controlling means.

39. The method of claim 13, wherein the segmenting further comprises:
segmenting the data into various length data frames in response to controls from the controlling means.

40. The method of claim 13, wherein the segmenting further comprises:
segmenting the data into a maximum length data frames allowed while maintaining the number of buffered data frames between the high and low watermark values.

41. The apparatus of claim 24, wherein the first transmit processor is further operable to segment data into various length data frames in response to controls from the controller.

42. The apparatus of claim 24, wherein the first transmit processor is further operable to segment data into a maximum length data frames allowed by the controller.

43. The apparatus of claim 10, wherein the allocated coding scheme comprises a designation for a current radio resource allocation assigned by a MAC protocol.

44. The apparatus of claim 10, wherein the allocated coding scheme includes at least one of:
a 20 octet radio link control radio block payload;
a 30 octet radio link control radio block payload;
a 36 octet radio link control radio block payload; or
a 50 octet radio link control radio block payload.

45. The apparatus of claim 34, wherein the allocated coding scheme comprises a designation for a current radio resource allocation assigned by a MAC protocol.

46. The apparatus of claim 34, wherein the allocated coding scheme includes at least one of:
a 20 octet radio link control radio block payload;
a 30 octet radio link control radio block payload;
a 36 octet radio link control radio block payload; or
a 50 octet radio link control radio block payload.

47. At least one processor within a mobile station (MS) configured to transmit data, comprising
a first module for receiving, internally within the MS, data from an application within the MS;
a second module for segmenting the data received from the MS into data frames;
a third module for buffering the data frames;
a fourth module for receiving buffered data frames;
a fifth module for transmitting the data frames;
a sixth module for receiving parameter data pertaining to the segmented data frames and radio link resources data pertaining to the transmission of data frames;
a seventh module for calculating a high watermark value and a low watermark value in response to the received parameter data and radio link resources data corresponding to maximal and minimal numbers of data frames to be buffered; and
a eighth module for maintaining the number of buffered data frames between the high and low watermark values by controlling the segmenting data into data frames by monitoring the calculated high watermark value and the calculated low watermark value,
wherein the seventh module for calculating is further arranged to calculate a size of a largest frame for transmission, wherein the high watermark value is calculated from the calculated size of the largest frame.

48. A computer program product within a mobile station (MS), comprising:
a non-transitory computer-readable medium comprising:
a first set of parameters for causing a computer to receive, internally within the MS, data from an application within the MS;
a second set of parameters for causing the computer to segment the data received from the application into data frames;
a third set of parameters for causing the computer to buffer the data frames;
a fourth set of parameters for causing the computer to receive buffered data frames;
a fifth set of parameters for causing the computer to transmit the data frames;
a sixth set of parameters for causing the computer to receive parameter data pertaining to the segmented data frames and radio link resources data pertaining to the transmission of data frames;
a seventh set of parameters for causing the computer to calculate a high watermark value and a low watermark value in response to the received parameter data and radio link resources data corresponding to maximal and minimal numbers of data frames to be buffered; and a eighth set of parameters for causing the computer to maintain the number of buffered data frames between the high and low watermark values by controlling the segmenting data into data frames by monitoring the calculated high watermark value and the calculated low watermark value, wherein the computer is further arranged to calculate a size of a largest frame from the largest data frame for transmission, wherein the high watermark value is calculated from the calculated size of the largest frame.

49. An apparatus within a mobile station (MS) for transmitting data, the apparatus comprising:

receiving means for receiving, internally within the MS, data from an application within the MS;

segmenting means for segmenting the data received from the application into data frames;

buffering means for buffering the data frames from the segmenting means;

transmitting means, connected to the buffering means to receive data frames therefrom, for transmitting the data frames; and controlling means for controlling the segmenting means, the controlling means being arranged to receive parameter data from the segmenting means and the transmitting means pertaining to the data and to the transmission of data frames, to calculate a high watermark value and a low watermark value corresponding to maximal and minimal numbers of data frames to be buffered in the buffering means, and to control the segmenting means to maintain the number of data frames in the buffering means between the high and low watermark values, wherein the controlling means is arranged to define a high band of values including the high watermark value and a low band of values including the low watermark value, wherein the controlling means is further arranged to calculate a size of a largest frame from the largest data frame that may be passed to the transmitting means for transmission, wherein the high watermark value is calculated from the calculated size of the largest frame.

50. The apparatus as claimed in claim 49, wherein the controlling means is arranged to generate a suspend signal for the segmenting means when the number of data frames in the buffering means is in the high band.

51. The apparatus as claimed in claim 49, wherein the controlling means is arranged to generate a resume signal for the segmenting means when the number of data frames in the buffering means is in the low band.

52. The apparatus as claimed in claim 49, wherein the controlling means is operable to control the transmitting means, the controlling means being arranged to generate a buffer empty signal for the transmitting means when the buffering means contains no data.

53. The apparatus as claimed in claim 49, wherein the segmenting means is arranged to transfer to the controlling means parameter data pertaining to a time-out value of a retransmission timer susceptible to delay.

54. The apparatus as claimed in claim 53, wherein the controlling means is arranged to calculate a transmit delay time by multiplying the time-out value by a constant.

55. The apparatus as claimed in claim 49, wherein the segmenting means is arranged to transfer to the controlling means parameter data pertaining to the size of the largest data frame that may be transmitted by the transmitter.

56. The apparatus as claimed in claim 55, wherein the controlling means is arranged to calculate the size of the largest frame from the largest data frame that may be passed to the transmission means for transmission.

57. The apparatus as claimed in claim 56, wherein data frames may be transmitted in acknowledged and unacknowledged modes, and the controlling means is arranged to calculate the size of the largest frame as the greater of the largest data frame that may be passed to the transmission means for transmission in the acknowledged mode and the largest data frame that may be passed to the transmission means for transmission in the unacknowledged mode.

58. The apparatus as claimed in claim 57, wherein the transmitting means is arranged to transmit data according to an allocated coding scheme and a number of allocated transmission slots and to transfer to the controlling means parameter data pertaining to the coding scheme, and the controlling means is arranged to calculate a transmit rate from the allocated coding scheme and the number of allocated transmission slots.

59. The apparatus as claimed in claim 58, wherein the controlling means is arranged to calculate the high watermark value from the calculated size of the largest frame and the calculated transmit rate.

60. The apparatus as claimed in claim 49, wherein the controlling means is arranged to calculate the low watermark value as a fraction of the high watermark value.

61. A method within a mobile station (MS) of transmitting data, the method comprising:

receiving, internally within a mobile station (MS) the MS, data from an application within the MS;

segmenting the data into data received from the application frames;

buffering the data frames;

receiving buffered data frames;

transmitting the data frames;

receiving parameter data pertaining to the data and to the transmission of data frames;

calculating a high watermark value and a low watermark value corresponding to maximal and minimal numbers of data frames to be buffered;

defining a high band of values including the high watermark value and a low band of values including the low watermark values; and maintaining the number of buffered data frames between the high and low watermark values, wherein the calculating further comprises calculating a size of a largest frame from the largest data frame that may be passed for transmission, wherein the high watermark value is calculated from the calculated size of the largest frame.

62. The method as claimed in claim 61, further comprising generating a suspend signal for the segmenting when the number of buffered data frames is in the high band.

63. The method as claimed in claim 61, further comprising generating a resume signal for the segmenting when the number of buffered data frames is in the low band.

64. The method as claimed in claim 61, further comprising generating a buffer empty signal for the transmitting when there are no buffered data frames.

65. The method as claimed in claim 61, further comprising calculating a transmit delay time by multiplying a time-out value of a retransmission timer susceptible to delay by a constant.

66. The method as claimed in claim 61, wherein data frames may be transmitted in acknowledged and unacknowledged modes, the method further comprising calculating the size of the largest frame that may be transmitted by the transmitter as the greater of the largest data frame that may be transmitted in the acknowledged mode and the largest data frame that may be transmitted in the unacknowledged mode.

67. The method as claimed in claim 66, wherein data is transmitted according to an allocated coding scheme and a number of allocated transmission slots, the method further comprising calculating a transmit rate from the allocated coding scheme and the number of allocated transmission slots.

68. The method as claimed in claim 67, wherein the high watermark value is calculated from the calculated size of the largest frame and the calculated transmit rate.

69. The method as claimed in claim 61, wherein low watermark value is calculated as a fraction of the high watermark value.

70. A data transmitter within a mobile station (MS) in which incoming data for transmission is received internally from an application within the MS and divided into data blocks and passed in frame transmission order to a radio link stage via a serial frame buffer which holds the data until the radio link is able to transmit it, the incoming data having associated with it various parameters and the radio link stage having allocated to it radio link resources which parameters and resources change independently of each other from time to time and are supplied to a controller which calculates high and low buffer levels therefrom, defines a high band of values including the high buffer level and a low band of values including the low buffer level and controls the passing of the data frames through the frame buffer to maintain the number of frames in the buffer at any instant of time at a level between the calculated high and low levels,
    wherein the controlling is further arranged to calculate a size of a largest frame from the largest data frame that may be passed for transmission, wherein the high level is calculated from the calculated size of the largest frame.

71. A transmitting apparatus within a mobile station (MS) for transmitting data, the transmitting apparatus comprising:
    a processor;
    memory in electronic communication with the processor;
    instructions stored in the memory, the instructions being executable by the processor to:
        receive, internally within the MS, data from an application within the MS;
        segment the data received from the application into data frames;
        buffer the data frames;
        receive buffered data frames;
        transmit the data frames;
        receive parameter data pertaining to the data and to the transmission of data frames;
        calculate a high watermark value and a low watermark value corresponding to maximal and minimal numbers of data frames to be buffered;
        define a high band of values including the high watermark value and a low band of values including the low watermark value; and
    maintain the number of buffered data frames between the high and low watermark values,
        wherein the calculating further comprises calculating a size of a largest frame from the largest data frame that may be passed for transmission, wherein the high watermark value is calculated from the calculated size of the largest frame.

72. A computer program product within a mobile station (MS) comprising:
    a non-transitory computer-readable media comprising:
    code for causing a computer to transmit data, comprising instructions to:
        receive, internally within the MS, data from an application within the MS;
        segment the data received from the application into data frames;
        buffer the data frames;
        receive buffered data frames;
        transmit the data frames;
        receive parameter data pertaining to the data and to the transmission of data frames;
        calculate a high watermark value and a low watermark value corresponding to maximal and minimal numbers of data frames to be buffered;
        define a high band of values including the high watermark value and a low band of values including the low watermark value; and
        maintain the number of buffered data frames between the high and low watermark values,
    wherein the calculating further comprises calculating a size of a largest frame from the largest data frame that may be passed for transmission, wherein the high watermark value is calculated from the calculated size of the largest frame.

73. The apparatus as claimed in claim 1, further comprising optimizing means for buffering of the data frames, comprising at least one or more of decreasing transmit delay susceptibility, increasing data frame throughput, maintaining optimal levels of RLC transmit buffering over a number of conditions, decreasing resource waste, and minimizing underutilization of the buffering means.

74. The method as claimed in claim 13, further comprising optimizing the buffering of the data frames, comprising at least one or more of decreasing transmit delay susceptibility, increasing data frame throughput, maintaining optimal levels of RLC transmit buffering over a number of conditions, decreasing resource waste, and minimizing underutilization of the buffering.

75. The apparatus as claimed in claim 24, further comprising optimizing means for buffering of the data frames, comprising at least one or more of decreasing transmit delay susceptibility, increasing data frame throughput, maintaining optimal levels of RLC transmit buffering over a number of conditions, decreasing resource waste, and minimizing underutilization of the buffer.

76. The apparatus as claimed in claim 49, further comprising optimizing means for the buffering of the data frames, comprising at least one or more of decreasing transmit delay susceptibility, increasing data frame throughput, maintaining optimal levels of RLC transmit buffering over a number of conditions, decreasing resource waste, and minimizing underutilization of the buffering means.

77. The method as claimed in claim 61, further comprising optimizing means for buffering of the data frames, comprising at least one or more of decreasing transmit delay susceptibility, increasing data frame throughput, maintaining optimal levels of RLC transmit buffering over a number of conditions, decreasing resource waste, and minimizing underutilization of the buffering.

* * * * *